United States Patent [19]

Huth et al.

[11] Patent Number: 5,453,485
[45] Date of Patent: Sep. 26, 1995

[54] PROCESS FOR REDUCING THE RESIDUAL MONOMER CONTENT IN AQUEOUS PLASTICS DISPERSIONS BASED ON POLYVINYL ESTER

[75] Inventors: Hans-Ullrich Huth, Egelsbach; Helmut Rinno, Hofheim; Bernahard Momper, Bischofsheim, all of Germany

[73] Assignee: Hoechst AG, Germany

[21] Appl. No.: 172,050

[22] Filed: Dec. 22, 1993

Related U.S. Application Data

[63] Continuation of Ser. No. 857,468, Mar. 25, 1992, abandoned.

[30] Foreign Application Priority Data

Mar. 27, 1991 [DE] Germany ............... 41 10 058.1

[51] Int. Cl.⁶ ........................................... C08F 6/16
[52] U.S. Cl. .................................. 528/488; 528/490
[58] Field of Search ........................... 528/488, 489, 528/490; 526/319, 330

[56] References Cited

U.S. PATENT DOCUMENTS

| | | | |
|---|---|---|---|
| 2,265,937 | 12/1941 | Dittmar | 528/489 |
| 4,220,754 | 9/1980 | Feldman | 528/480 |
| 4,278,582 | 7/1981 | Miller | 528/488 |

*Primary Examiner*—Joseph L. Schofer
*Assistant Examiner*—Tom Weber
*Attorney, Agent, or Firm*—Bierman and Muserlian

[57] ABSTRACT

Preparation of aqueous plastics dispersions which contain vinyl ester polymers or vinyl ester copolymers and have reduced contents of undesirable preparation-related residual monomeric vinyl esters and, where appropriate, acetaldehyde, from corresponding starting dispersions such as are obtainable by customary polymerization or copolymerization methods from ethylenically unsaturated monomers, by selective alkaline hydrolysis of the residual monomeric vinyl esters which can be hydrolyzed under alkaline conditions and if appropriate oxidation of the acetaldehyde to acetic acid in the aqueous dispersions.

13 Claims, No Drawings

PROCESS FOR REDUCING THE RESIDUAL MONOMER CONTENT IN AQUEOUS PLASTICS DISPERSIONS BASED ON POLYVINYL ESTER

PRIOR APPLICATION

This application is a continuation of U.S. patent application Ser. No. 857,468 filed Mar. 25, 1992, now abandoned.

Process for reducing the residual monomer content in aqueous plastics dispersions based on polyvinyl ester The invention relates to a process for reducing undesirable preparation-related residual monomer contents in aqueous plastics dispersions, the polymer molecules of which contain monomer units from vinyl esters and which have contents of residual monomeric vinyl esters and, where appropriate, acetaldehyde, by selective alkaline hydrolysis of the residual monomeric vinyl esters which can be hydrolyzed under alkaline conditions and oxidation of the acetaldehyde already present in the dispersion, where appropriate, and of the acetaldehyde additionally formed in the dispersion as the hydrolysis product from the vinyl esters. Highly volatile vinyl esters, preferably vinyl acetate and vinyl propionate, and acetaldehyde, in particular vinyl acetate and acetaldehyde, are preferably eliminated.

Aqueous plastics dispersions which contain polymeric plastics particles based on ethylenically unsaturated monomers with monomer units from vinyl esters have been known for a long time and have many fields of use, for example as binders for paints and coatings, as textile auxiliaries, as adhesives, as sizing agents for paper, as binders for non-woven fibers and imitation leather and the like. The advantages of binder systems and adhesives based on an aqueous dispersion are, inter alia, their easy handling (lack of toxicity, non-combustibility, easy cleaning of the working apparatuses, problem-free disposal) and their advantageous ecological properties, compared with conventional solvent-containing varnishes and resins and solutions thereof in organic solvents. Organic solvents are largely or completely dispensible in the aqueous plastics dispersions, and even polymers having very high molecular weights can be prepared and processed without risk as aqueous dispersions of high polymer content and low viscosity, in contrast to solutions of such polymers in organic solvents, which are in general very highly viscous and consequently can be used only in a low concentration and release correspondingly large quantities of solvent when used.

Aqueous plastics dispersions are therefore finding increasingly wider use and novel fields of application. Amongst the plastics dispersions based on polyvinyl esters, various types are known in particular, for example vinyl acetate homopolymer dispersions, for example for adhesives, vinyl acetate/vinyl versatate or vinyl acetate/butyl acrylate copolymer dispersions, for example for paint films, vinyl acetate/ethylene or vinyl acetate/ethylene/vinyl chloride copolymer dispersions, for example as binders for non-woven fibers, as sizing agents in papermaking and as binders for paints, or vinyl acetate/dibutyl maleate copolymer dispersions. In addition, so-called pure acrylate polymer or copolymer dispersions and styrene/acrylate copolymer dispersions are also known, for example for particularly high-quality coatings and for weatherproof external paint films, it also being possible for these dispersions to be combined with plastics dispersions based on polyvinyl ester for modification of their properties or to be extended with these for reasons of cost.

It is furthermore known that the customary aqueous plastics dispersions in some cases still contain small amounts of low molecular weight organic solvents, for example film-forming auxiliaries and/or external plasticizers, monomer solvents from the polymerization process, cleavage products or by-products of the starting monomers, the presence of which can cause trouble in some applications, in particular if the compounds are highly volatile, possibly toxic or possibly odor-intensive organic compounds. These by-products cause trouble in particular when the dispersions are used for interior applications, for example for interior paint films, interior paints and interior plasters, especially if these are processed in closed rooms, where odor-free and emission-free products are required ever more frequently nowadays. The demand for plastics dispersions which are virtually free from residual monomers, in particular from highly volatile residual monomers, and from other volatile organic substances is therefore very topical, and the troublesome residual monomer concentration (RMC) in the aqueous plastics dispersions should be at least in the range of <0.1% by weight, based on the dispersion. Some customary types of polymer or copolymer dispersion, such as, for example, the pure acrylate dispersions and the styrene/acrylate copolymer dispersions, can already meet these RMC requirements on the basis of their advantageous preparation processes, in which they are obtained with RMC values of $\leq 0.01\%$ by weight, based on the dispersion. In some cases, the desired RMC values can also be achieved by specific after-treatment measures on the dispersions, such as, for example, distillation in vacuo, steam distillation, blowing through air or blowing through nitrogen or after-treatment with redox polymerization catalysts. The residual monomer contents of vinyl chloride and of acrylonitrile, for example, can be reduced directly to RMC values of $\leq 0.001\%$ by weight, based on the dispersion, by such after-treatment measures. However, the known measures for subsequent reduction of the RMC values cannot be used satisfactorily with all types of monomer and all monomer concentrations. Thus, for example, redox polymerization catalysts can be employed satisfactorily only at residual monomer starting concentrations in the range from 0.1 to 0.5% by weight, based on the dispersion, in which case moreover the RMC value can often be reduced only to at most 0.1% by weight, based on the dispersion. The redox after-polymerization process is therefore not reliable enough in many cases for reducing the RMC values, at least into the range from 0.05 to 0.1% by weight, based on the dispersion. There has therefore been no lack of attempts to increase the effectiveness of the redox after-treatment, for example by slowing down the cooling of the polymerization mixture in the reactor, which has, inter alia, adverse effects on the space-time yields of the polymerization. Another disadvantage is that the redox system, in particular the oxidizing agent component thereof, in some cases leads to a reduction in the viscosity of the dispersion, associated with a reduction in the stability of the dispersion. Chemical after-treatments of the dispersions, such as, for example, the addition of redox systems, furthermore introduce additional substances into the product, which is often undesirable, especially if these substances are toxicologically unacceptable or, such as, for example, Rongalit, are undesirable as a product constituent for the processors of the dispersions. Monomer removal methods by means of vacuum distillation or steam distillation are also in general unsatisfactory, although in many cases they can render a residual monomer reduction down to the lower ppm range possible. However, they cause considerable energy costs, prolonged reactor occupation, additional working up of the distillate and formation of specks in the dispersion, as well as the formation of deposits on the reactor walls. Higher-boiling residual monomers, such as, for example, vinyl versatate or octyl acrylate, are also eliminated only incompletely. The dispersions for which as yet no effective residual monomer elimination process has been disclosed include, above all, the homo- and copolymer dispersions of vinyl acetate and also of vinyl propionate, but especially of vinyl acetate.

As is known, aqueous homo- and copolymer dispersions of vinyl acetate in general contain 0.2 to 0.5% by weight of residual monomeric vinyl acetate and 0.01 to 0.05% by weight of acetaldehyde, in each case based on the dispersion, depending on the type and the preparation method. The residual monomeric vinyl acetate content can be reduced to about 0.05 to 0.1% by weight, based on the dispersion, by redox after-treatments, while it is virtually impossible to reduce the acetaldehyde content by this method. However, as is known, acetaldehyde has recently proved to be particularly toxic and is highly undesirable in aqueous plastics dispersions.

The use of physical monomer removal methods in general presents problems in the case of plastics dispersions of vinyl acetate polymers and copolymers, in particular because of the high viscosities of these dispersions, the difficulty of maintaining the stability of the dispersion while carrying out distillations (formation of specks and formation of deposits on the reactor walls) and the marked tendency of these dispersions to foam.

The present invention was thus based on the object of developing a process which enables the residual monomer concentration, in particular of homo- and copolymer dispersions of vinyl acetate, preferably the highly volatile residual monomer concentration thereof, to be reduced to values of $\leq 0.01\%$ by weight, based on the dispersion. It was furthermore desirable here for the acetaldehyde content often present in vinyl ester polymer or copolymer dispersions also to be likewise reduced permanently without impairing the characteristic use properties of the dispersions.

Surprisingly, it has now been possible to achieve this object by subjecting the dispersions to a subsequent hydrolysis treatment at a weakly alkaline pH value and elevated temperature, in the course of which the residual monomeric vinyl ester contents which can be hydrolyzed under alkaline conditions are split virtually completely into carboxylic acids and acetaldehyde by hydrolysis, while the corresponding vinyl ester units in the polymer or copolymer molecules of the polymeric dispersion particles surprisingly remain largely unchanged. By simultaneous or subsequent addition of oxidizing agents, the acetaldehyde content in the dispersions can moreover be largely eliminated in that acetaldehyde can be converted oxidatively into acetic acid. The hydrolysis treatment in the weakly alkaline pH range is preferably carried out at pH 7.5 to 9, in particular at pH 8 to 8.5, it being necessary for the pH value chosen to be maintained or kept constant at ±0.1 until hydrolysis of the monomeric vinyl ester is complete, if appropriate with the simultaneous presence of an oxidizing agent or with addition of the oxidizing agent after the hydrolysis has taken place, until oxidation of the acetaldehyde is complete. According to the invention, the hydrolysis of the residual monomeric vinyl ester is complete when, at the hydrolysis temperature chosen, the weakly alkaline pH value chosen remains constant within the range of ±0.1 pH units, preferably ±0.05 pH units, without further metering in of the basic compound used. The dispersion is then cooled to room temperature, any excess oxidizing agent present therein is destroyed chemically or catalytically and the dispersion is brought back to its original, preferably acid, in particular weakly acid, pH by addition of a corresponding amount of an inorganic or organic acid. When the hydrolysis reaction and oxidation have been carried out, the content of residual monomeric vinyl esters which can be hydrolyzed under alkaline conditions and of acetaldehyde is in each caseless than 0.01% by weight, preferably less than 0.002% by weight, based on the dispersion, i.e. according to the invention, the residual monomeric vinyl ester contents which are particularly troublesome in the starting dispersion and the acetaldehyde can be eliminated virtually completely. The water contents introduced into the dispersion with the reagents required in the hydrolysis reaction and oxidation reduce the percentage polymeric solids content in the dispersion accordingly, which in practice does not have to be a disadvantage, since the starting dispersion in general can already be adjusted easily to a correspondingly higher starting solids content during its preparation.

The invention therefore relates to a process for reducing the content of residual monomeric vinyl esters and, where appropriate, of acetaldehyde in aqueous plastics dispersions which contain disperse polymer particles based on ethylenically unsaturated monomers with monomer units of vinyl esters and have been prepared from the monomers or comonomers on which they are based by emulsion, suspension, bead or solution polymerization, which comprises, for elimination of residual contents of monomeric vinyl esters and, where appropriate, of acetaldehyde, subjecting the monomeric vinyl esters which can be hydrolyzed under alkaline conditions to hydrolytic splitting into the corresponding carboxylic acids and into acetaldehyde by a hydrolysis treatment of the dispersions at a weakly alkaline pH and elevated temperature and simultaneously or subsequently, as appropriate, oxidizing the acetaldehyde to acetic acid by addition of an oxidizing agent.

The process according to the invention can preferably be used for elimination of residual monomeric vinyl acetate and vinyl propionate, in particular vinyl acetate.

Starting plastics dispersions which are preferably employed are those in which the polymer particles contain homopolymers or copolymers of vinyl acetate or vinyl propionate, in particular of vinyl acetate, or which are composed of homo- or copolymers of vinyl acetate or vinyl propionate, preferably of vinyl acetate, and if appropriate contain monomer units of vinyl versatate.

Starting plastics dispersions which are preferably employed are furthermore those in which the polymer particles contain copolymers of vinyl acetate and one or more monomer units from the group comprising vinyl esters of $(C_3-C_{18})$-carboxylic acids, acrylic esters, methacrylic esters, half-esters or diesters of maleic acid, fumaric acid or itaconic acid with $(C_1-C_{22})$-alcohols or $(C_2-C_{22})$hydroxyalcohols, amides or mono- or di-$(C_1-C_{12})$alkylamides or -$(C_2-C_{12})$alkylolamides of ethylenically unsaturated $(C_3-C_5)$-mono- or -dicarboxylic acids, ethylene, vinyl chloride, vinylidene chloride, acrylonitrile, acrylic acid, methacrylic acid and vinylsulfonic acid.

The hydrolysis treatment of the dispersion at a weakly alkaline pH and at elevated temperature is preferably carried out in the pH range from 7.5 to 9, in particular from 8 to 8.5, and preferably in the temperature range from 20° to 100° C., in particular 40° to 80° C., particularly preferably 50° to 70° C. The reaction of acetaldehyde with an organic or inorganic oxidizing agent preferably also takes place at these preferred pH values and preferred hydrolysis temperatures, and in particular either during the hydrolysis reaction or thereafter, preferably at the same time.

For carrying out the hydrolysis reaction, successive inorganic or organic basic compounds are added to the aqueous plastics dispersion at the elevated temperature chosen, preferably in at least stoichiometric amounts, based on the free acids already present, where appropriate, for neutralization in the dispersion plus the acids also formed from the vinyl esters during the hydrolysis reaction and if appropriate by oxidation of acetaldehyde, so that, in the dispersion, a weakly alkaline pH value results, which is to be kept largely constant throughout the course of the hydrolysis reaction, during which any ranges in variation or deviations from the weakly alkaline pH value chosen should preferably be no greater than ±0.1 to 0.05 pH units. The basic compounds are preferably added in the form of dilute aqueous solutions of bases, in particular with base concentrations of 0.5 to 50% by weight, particularly preferably 5 to 30% by weight, to allow exact metering when adjusting the pH. The pH of the dispersion is preferably monitored constantly by means of a glass electrode, to ensure the pH is adjusted or maintained exactly.

The hydrolysis treatment of the dispersion can be carried out discontinuously, for example in a stirred apparatus which can be heated, or continuously, for example in a tubular reactor which can be heated, in which case temperatures of up to 100° C., preferably 85° to 100° C., and residence times of 1 to 5 minutes can be advantageous in the tubular reactor. The rate of hydrolysis increases as the reaction temperature increases under comparable conditions. The hydrolysis and oxidation treatment can in general preferably last between 1 minute and 7 hours, in particular 6 minutes to 4 hours. The starting polymer dispersions, which are often obtained hot immediately after their preparation, are preferably passed directly to the hydrolysis treatment according to the invention.

Basic compounds which are used in the context of the invention are preferably the following compounds or in particular aqueous solutions or aqueous dilutions thereof:

alkali metal oxides, alkali metal hydroxides, alkali metal peroxides, alkali metal carbonates, alkali metal bicarbonates, alkaline earth metal oxides, alkaline earth metal hydroxides, alkaline earth metal peroxides, alkaline earth metal carbonates, ammonia, alkanolamines and quaternary alkyl- or alkylarylammonium hydroxides, alkali metal compounds, in particular sodium hydroxide, and ammonia being particularly preferred.

Oxidizing agents which are used in the dispersion, preferably under the conditions of the hydrolysis treatment, for converting the acetaldehyde into acetic acid are preferably the following compounds:

organic or inorganic oxidizing agents, preferably from the group comprising inorganic and organic peroxides, perhydroxy compounds, peresters, persulfates, peroxydisulfates, perborates, $H_2O_2$, ozone and oxygen, in particular aqueous solutions or dilutions of non-gaseous oxidizing agents. $H_2O_2$ and aqueous dilutions thereof are particularly preferred.

The oxidizing agent is preferably added to the dispersion in a 3- to 7-fold stoichiometric excess, based on the oxidizable constituents in the dispersion, in particular based on the acetaldehyde to be oxidized.

When the oxidation of the acetaldehyde has taken place, any excess oxidizing agent still present in the dispersion is destroyed catalytically or reductively, preferably by addition of catalytic or reductive compounds, in particular catalytic or reductive compounds from the group comprising metal salts, metal oxides, metal hydroxides, metal powders of iron, cobalt, nickel, palladium, platinum and silver and reducing agents from the group comprising ascorbic acid, Rongalite, sulfites, sugars or hydrazine compounds.

Catalytic or reductive compounds are preferably added to the dispersion after prior cooling of the dispersion from which the monomer has been removed to room temperature.

According to the invention, the contents of residual monomeric vinyl esters which can be hydrolyzed under alkaline conditions, preferably of vinyl acetate, and of acetaldehyde in the aqueous plastics dispersion when the elimination reactions according to the invention have ended are in each case below 0.01% by weight, preferably ≦0.002% by weight, in each case based on the dispersion.

When the elimination reactions have ended, the pH of the aqueous dispersions from which the monomer has been removed can furthermore be brought back to the original pH of the starting dispersion, preferably to a pH of <7, by addition of inorganic or organic acids. This pH value adjustment is preferably carried out by addition of acids from the group comprising acetic acid, propionic acid, formic acid and sulfuric acid, preferably aqueous dilutions of these acids.

The aqueous plastics dispersions which are based on polymers containing vinyl ester monomer units, are freed, according to the invention, from residual monomer contents and acetaldehyde and are obtained in a low-emission or emission-free form are preferably suitable as binders in low-emission or emission-free aqueous formulations for paint films, coatings, plaster mortars, decorating mortars, adhesives, sizing agents for paper, binders for non-woven fibers, textile auxiliaries, foodstuffs coating agents, paints and industrial chemical formulations, in particular for applications in interior rooms or in closed rooms.

The invention is illustrated in more detail by the following examples.

EXAMPLE 1

1 kg of an aqueous vinyl acetate/vinyl versatate copolymer dispersion is initially introduced into a 2 l four-necked flask with a Claisen attachment, stirrer, reflux condenser, thermometer, dropping funnel and pH-measuring electrode (glass electrode) and is heated to 55° C., while stirring. The dispersion contains 11.5% by weight of polyvinyl alcohol as a protective colloid and 0.3% by weight of an anionic emulsifier, in each case based on the copolymer. The pH of the dispersion is 4.4 and the solids content is 35% by weight, based on the dispersion. Analysis by gas chromatography shows contents of 0.12% by weight of residual monomeric vinyl acetate and 0.011% by weight of acetaldehyde, in each case based on the dispersion. A 15% strength by weight aqueous $Na_2O_2$ solution is metered into the dispersion, with vigorous stirring, until the pH is 8.5±0.1 (glass electrode) and remains constant. During this procedure, the higher metering rate initially necessary is reduced gradually and the metering is complete after about 5 hours. The consumption of 15% strength by weight $Na_2O_2$ solution is 17.6 ml, corresponding to 33.5 mmol of $Na_2O_2$. After cooling to room temperature, the dispersion has a pH of 7.9, a solids content of 33.7% by weight, a content of residual monomeric vinyl acetate of 0.008% by weight and a content of acetaldehyde of 0.005% by weight, in each case based on the dispersion. The dispersion is then spray dried and the properties of the resulting polymer powder are compared with those of a polymer powder prepared from the starting dispersion in an analogous manner. Apart from a slight increase in the water uptake of the polymer powder prepared from the dispersion from which the monomer has been removed according to the invention, no other differences are detectable in the properties of the two polymer powders.

EXAMPLE 2

1 kg of an aqueous vinyl acetate homopolymer dispersion stabilized with an emulsifier and a protective colloid is initially introduced into the apparatus described in Example 1. The pH of the dispersion is 4.8 and the solids content is 53% by weight, the residual monomeric vinyl acetate content determined by gas chromatography is 0.37% by weight and the acetaldehyde content is 0.036% by weight, in each case based on the dispersion.

30 g of a 30% strength by weight aqueous $H_2O_2$ solution are added, while stirring, to the dispersion which has been initially introduced and the mixture is heated to 60° C. 20% strength by weight aqueous sodium hydroxide solution is then metered in at 60° C., with vigorous stirring, until the pH is 8.0±0.1 and remains constant, which is the case after about 1.5 hours. The consumption of 20% strength by weight sodium hydroxide solution is 24 ml. After the dispersion has been cooled to room temperature, 32 ml of 5% strength by weight aqueous ascorbic acid solution are metered in, while stirring, and after 30 minutes the pH is brought to 4.5 by metering in 50 ml of 20% strength by weight aqueous acetic acid. A speck-free dispersion which has a solids content of 48.9% by weight, based on the dispersion, is free from peroxides and in which the contents of monomeric vinyl acetate and of acetaldehyde are in each case below the detection limit of 0.002% by weight, based on the dispersion, results.

EXAMPLE 3

1 kg of an aqueous vinyl acetate/vinyl versatate copolymer dispersion which contains 2% by weight of a protective colloid and 6% by weight of an emulsifier (anionic/nonionic), in each case based on the copolymer, is initially introduced into the apparatus described in Example 1. The solids content of the dispersion is 49.8% by weight, based on the dispersion, and the pH is 2.9. The content of residual monomeric vinyl acetate, determined by gas chromatography, is 0.35% by weight and the acetaldehyde content is 0.032% by weight, in each case based on the dispersion.

The dispersion initially introduced is heated to 65° C., while stirring, and a 15% strength by weight aqueous potassium hydroxide solution is metered in at this temperature, with vigorous stirring, until the pH is 8.0±0.1 and remains constant, which is the case after about 3 hours. The consumption of 15% strength by weight potassium hydroxide solution is 50.5 ml. The dispersion is cooled to room temperature, and tested and analyzed. The residual monomeric vinyl acetate content is below the detection limit of 0.002% by weight, based on the dispersion. As a result of the absence of an oxidizing agent, the acetaldehyde content rises to 0.183% by weight, based on the dispersion. The dispersion is free from specks but is slightly yellow-colored and has a solids content of 48.1% by weight, based on the dispersion. After cooling to room temperature and being left to stand at room temperature for about 12 hours without addition of acid, the pH drops to 7.3 and then remains constant.

EXAMPLE 4

1 kg of an aqueous vinyl acetate/butyl acrylate copolymer dispersion, the solids content of which is 54.5% by weight, based on the dispersion, and the pH of which is 4.1, is initially introduced into the apparatus described in Example 1. The dispersion contains 0.35% by weight of hydroxyethylcellulose as a protective colloid and 4.4% by weight of emulsifier (anionic/nonionic), in each case based on the copolymer. The content of residual monomeric vinyl acetate, determined by gas chromatography, is 0.18% by weight and the acetaldehyde content is 0.015% by weight, in each case based on the dispersion.

32 g of 70% strength by weight tert-butyl hydroperoxide are added to the dispersion initially introduced, while stirring, and the mixture is heated to 60° C. A 10% strength by weight aqueous sodium hydroxide solution is then metered in at 60° C., while stirring vigorously, until the pH is 8.0±0.1 and remains constant, which is the case after about 6 hours. The consumption of 10% strength by weight sodium hydroxide solution is 31 ml. After the dispersion has been cooled to room temperature, 30 ml of a 5% strength by weight aqueous ascorbic acid solution are metered in, while stirring, and after 30 minutes the pH is then brought to 4.5 by metering in 57 ml of 10% strength by weight aqueous acetic acid. A speck-free dispersion which has a solids content of 51.1% by weight, based on the dispersion, and is free from peroxides and in which the content of monomeric vinyl acetate is 0.005% by weight and of acetaldehyde is 0.003% by weight, in each case based on the dispersion, results.

EXAMPLE 5

1 kg of the starting dispersion described in Example 1 is initially introduced into the apparatus described in Example 1. The dispersion initially introduced is heated to 65° C. and 14 g of a 30% strength by weight aqueous $H_2O_2$ solution are added in the course of 5 minutes, while stirring. 6.7% strength by weight aqueous sodium hydroxide solution is then metered in at 65° C., with vigorous stirring, until the pH is 8.5±0.1 and remains constant, which is the case after about 2 hours. The consumption of 6.7% strength by weight sodium hydroxide solution is 55.5 ml. After the dispersion has been cooled to room temperature, 65 ml of a 2% strength by weight aqueous $CoCl_3$ solution is metered in to destroy excess $H_2O_2$, this advantageously being carried out dropwise in order to prevent excessive foaming. The metering in and the evolution of gas are complete after about 3 hours, after which the dispersion is stirred for a further 3 hours. A speck-free dispersion which has a solids content of 32% by weight, based on the dispersion, and is free from peroxides and in which the contents of monomeric vinyl acetate and of acetaldehyde are in each case below the detection limit of 0.002% by weight, based on the dispersion, results.

The essential features, parameters and results of Examples 1 to 5 are shown in summary form in Table 1.

TABLE 1

Reduction of the content of residual monomeric vinyl esters and of acetaldehyde in aqueous plastics dispersions containing vinyl ester homopolymers and/or vinyl ester copolymers by selective alkaline hydrolysis and oxidation

| | Reaction conditions for reduction of the residual monomers and acetaldehyde in the dispersion | | | | | | | Residual monomer and acetaldehyde per-contents in the dispersion (% by weight, based on the dispersion) | | | |
|---|---|---|---|---|---|---|---|---|---|---|---|
| | | | | | | Addition of acid | Reducing agent | Vinyl acetate | | Acetaldehyde | |
| Dispersion acc. to Ex. No. | Temperature (°C.) | pH (±0.1) | Base for alkaline pH adjustment | Oxidizing agent | Reaction time (hrs) | for pH reduction after the reaction | or catalyst for eliminating excess oxidizing agent | before the reaction | after the reaction | before the reaction | after the reaction |
| 1 | 5 | 8.5 | Na$_2$O$_2$ | Na$_2$O$_2$ | 5 | — | — | 0.12 | 0.008 | 0.011 | 0.005 |
| 2 | 60 | 8.0 | NaOH | H$_2$O$_2$ | 1.5 | Acetic acid | Ascorbic acid | 0.37 | <0.002 | 0.036 | <0.002 |
| 3 | 65 | 8.0 | KOH | — | 3 | — | — | 0.35 | <0.002 | 0.032 | 0.183 |
| 4 | 60 | 8.0 | NaOH | t-butyl hydroperoxide | 6 | Acetic acid | Ascorbic acid | 0.18 | 0.005 | 0.015 | 0.003 |
| 5 | 65 | 8.5 | NaOH | H$_2$O$_2$ | 2 | — | CoCl$_3$ | 0.12 | 0.002 | 0.011 | <0.002 |

We claim:

1. A process for reducing the content of residual monomeric vinyl esters and optionally of acetaldehyde in aqueous plastics dispersions which contain disperse polymer particles based on ethylenically unsaturated monomers with monomer units of vinyl esters and have been prepared from the monomers or comonomers on which they are based by emulsion, suspension, bead or solution polymerization, which comprises for elimination of residual contents of monomeric vinyl esters and optionally of acetaldehyde, subjecting the monomeric vinyl esters which can be hydrolyzed under alkaline conditions to hydrolytic splitting into the corresponding carboxylic acids and into acetaldehyde by a hydrolysis treatment of the dispersions at a weakly alkaline pH and elevated temperature while the corresponding vinyl ester units in the polymer or copolymer molecules of the polymeric dispersion particles remain largely unchanged, and simultaneously or subsequently oxidizing the acetaldehyde to acetic acid by addition of an oxidizing agent without impairing the properties of the dispersion.

2. The process as claimed in claim 1, wherein the polymer particles contain monomer units of vinyl acetate or vinyl propionate and can contain monomer units of vinyl versatate.

3. The process as claimed in claim 1, wherein the polymer particles contain homopolymers or copolymers of vinyl acetate or are composed of homo- or copolymers of vinyl acetate.

4. The process as claimed in claim 1, wherein the polymer particles contain copolymers of vinyl acetate and one or more monomer units from the group consisting of vinyl esters of ($C_3$–$C_{18}$)-carboxylic acids, acrylic esters, methacrylic esters, half-esters or diesters of maleic acid, fumaric acid or itaconic acid with ($C_1$–$C_{22}$)-alcohols or ($C_2$–$C_{22}$)-hydroxy-alcohols, amides or mono- or di-($C_1$–$C_{12}$)alkylamides or -($C_2$–$C_{12}$)alkylolamides of ethylenically unsaturated ($C_3$–$C_5$)-mono- or -dicarboxylic acids, ethylene, vinyl chloride, vinylidene chloride, acrylonitrile, acrylic acid, methacrylic acid or vinylsulfonic acid.

5. The process as claimed in claim 1, wherein the hydrolysis treatment is carried out in the pH range from 7.5 to 9 at temperatures in the range from 20° to 100° C. and if appropriate the reaction of the acetaldehyde with an oxidizing agent under the hydrolysis conditions is carried out either during the hydrolysis reaction or thereafter.

6. The process as claimed in claim 1, wherein the process is carried out discontinuously or continuously, the continuous process being carried out in a tubular reactor in the temperature range from 85° to 100° C.

7. The process as claimed in claim 1, wherein the hydrolysis treatment is carried out with the addition of inorganic or organic basic compounds in the form of aqueous solutions or dilutions of these basic compounds, and using at least stoichiometric amounts of these basic compounds, based on the total stoichiometric amount of acid constituents already present in the dispersion plus the acids formed by the residual monomer hydrolysis and if appropriate the acetaldehyde oxidation, the pH chosen for the hydrolysis treatment of the dispersion being kept constant.

8. The process as claimed in claim 1, wherein the hydrolysis treatment is carried out with addition of basic compounds from the group comprising alkali metal oxides, alkali metal hydroxides, alkali metal peroxides, alkali metal carbonates, alkali metal bicarbonates, alkaline earth metal oxides, alkaline earth metal hydroxides, alkaline earth metal peroxides, alkaline earth metal carbonates, ammonia, alkanolamines and quaternary alkyl-or alkylarylammonium hydroxides, or aqueous solutions of these compounds.

9. The process as claimed in claim 1, wherein inorganic or organic oxidizing agents from the group consisting of inorganic or organic peroxides, perhydroxy compounds, peresters, persulfates, peroxydisulfates, perborates, $H_2O_2$, ozone and oxygen, or aqueous solutions or dilutions of non-gaseous oxidizing agents, are used for the oxidation of the acetaldehyde.

10. The process as claimed in claim 1, wherein the oxidizing agent is used in a 3- to 7-fold stoichiometric excess and, when the oxidation reaction has ended, any excess oxidizing agent is destroyed by addition of catalytic or reductive compounds from the group consisting of metal salts, metal oxides, metal hydroxides, metal powders of iron, cobalt, nickel, palladium, platinum and silver or reducing agents from the group comprising ascorbic acid, Rongalit, sulfites, sugars and hydrazine compounds.

11. The process as claimed in claim 1, wherein the contents of residual monomeric vinyl esters which can be hydrolyzed under alkaline conditions and of acetaldehyde in the aqueous plastics dispersion when the hydrolytic and oxidative elimination reactions have ended are in each case below 0.01% by weight based on the dispersion.

12. The process as claimed in claim 1, wherein, when the elimination reactions have ended, the pH of the aqueous dispersion is brought to the original pH of the starting dispersion by addition of inorganic or organic acids from the group consisting of acetic acid, propionic acid, formic acid and sulfuric acid, or aqueous dilutions of the acids.

13. A process for reducing the content of residual monomeric vinyl esters and optionally of acetaldehyde in aqueous plastic dispersions which contain disperse polymer particles based on ethylenically unsaturated monomers with monomers or comonomers on which they are based by emulsion, suspension, bead or solution polymerization, which comprises for elimination of residual contents of monomeric vinyl esters which can be hydrolyzed under alkaline conditions to hydrolytic splitting into the corresponding carboxylic acids and into acetaldehyde by a hydrolysis treatment of the dispersions at a weakly alkaline pH and elevated temperature in the presence of a basic compound selected from the group consisting of alkali metal oxides, alkali metal hydroxides, alkali metal peroxides, alkali metal carbonates, alkaline earth metal oxides, alkaline earth metal hydroxides, alkaline earth metal peroxides, alkaline earth metal carbonates, ammonia, alkanolamines and quarternary alkyl- or alkylaryl-ammonium hydroxides, or aqueous solutions of these compounds and simultaneoulsy or subsequently oxidizing the acetaldehyde to acetic acid by addition of an oxidizing agent.

* * * * *